F. OPPENHEIMER & W. G. SPIEGEL.
TICKET HOLDING AND SERVING DEVICE.
APPLICATION FILED MAY 8, 1909.

1,016,893.

Patented Feb. 6, 1912.
4 SHEETS—SHEET 1.

Witnesses:
Charles C. Abbe
Rose Menk

Fred Oppenheimer
Wm. G. Spiegel
Inventor
By their Attorney John D. Morgan

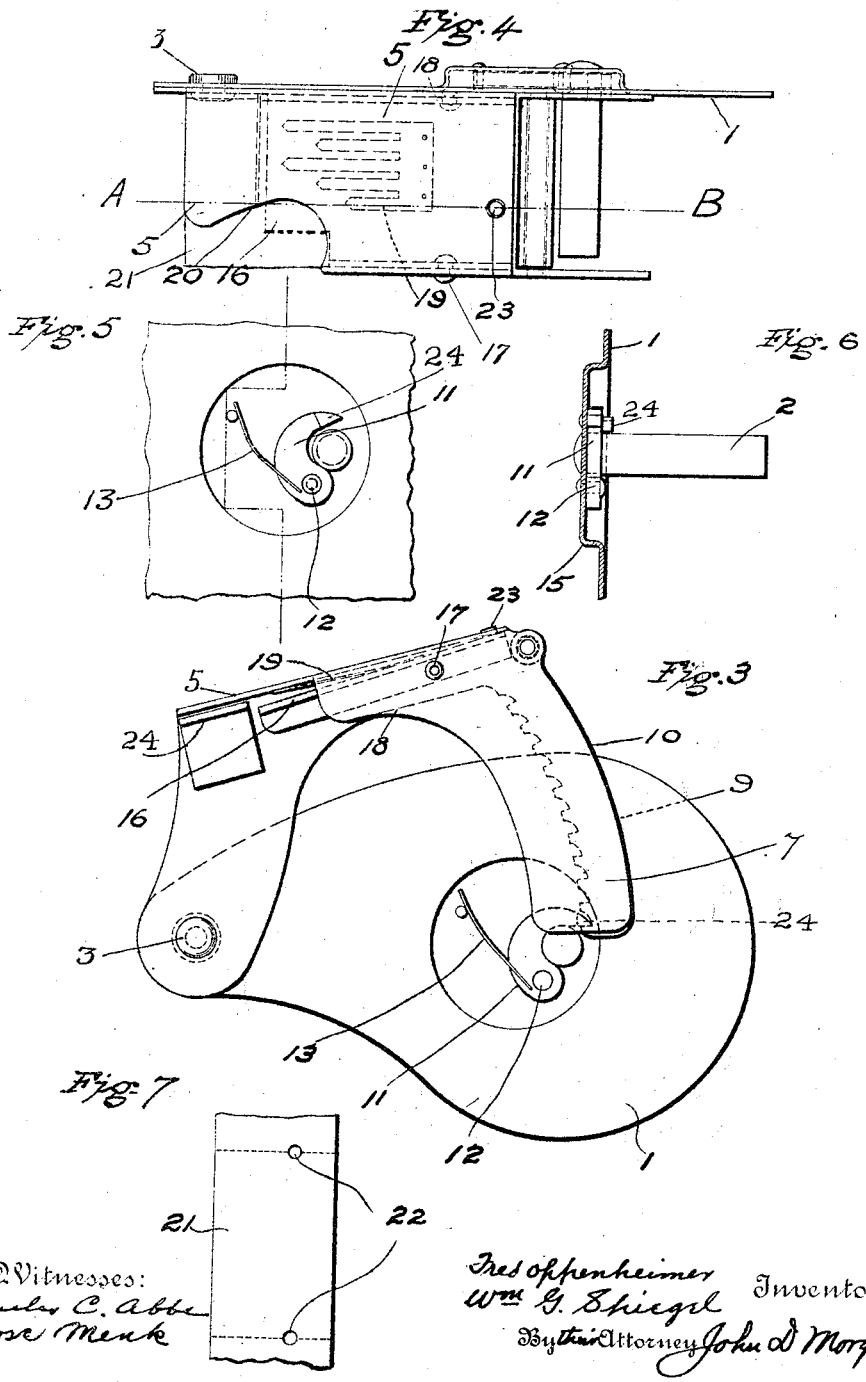

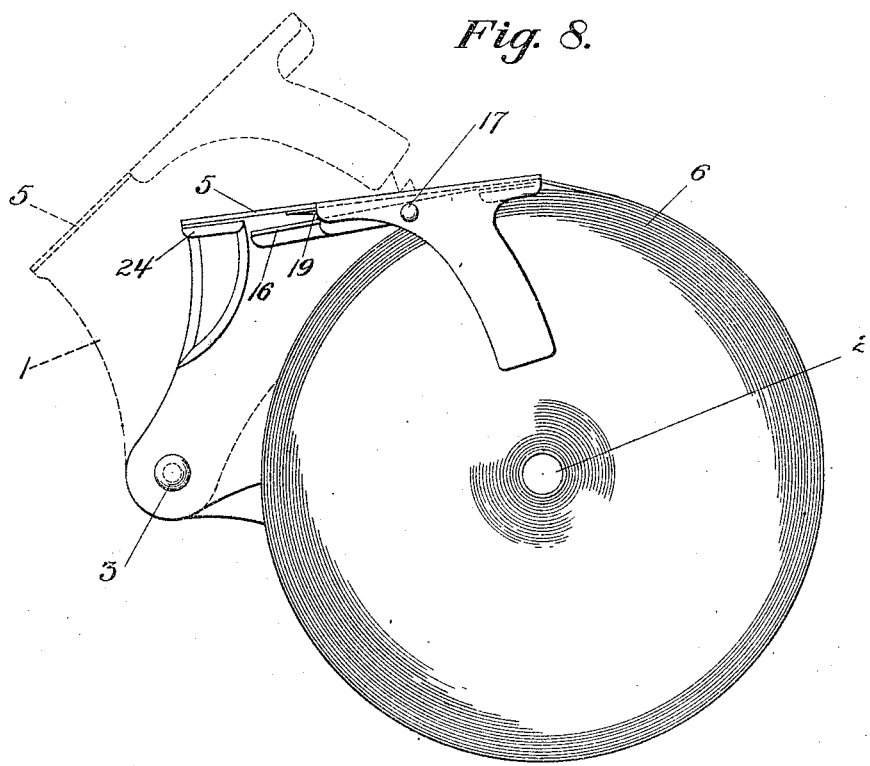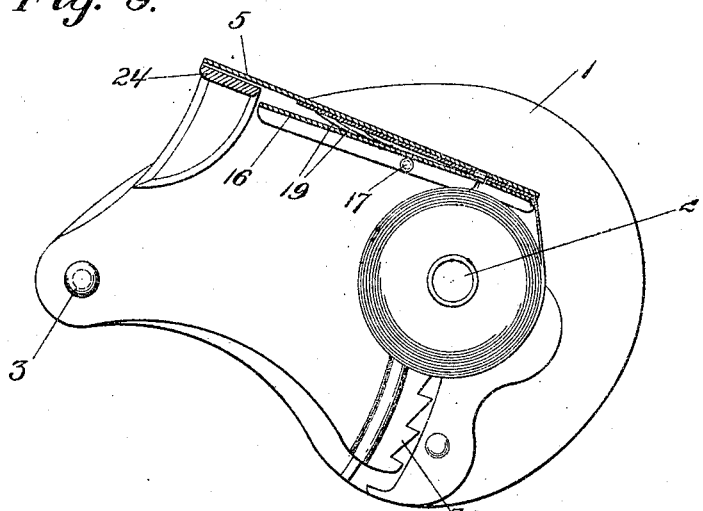

F. OPPENHEIMER & W. G. SPIEGEL.
TICKET HOLDING AND SERVING DEVICE.
APPLICATION FILED MAY 8, 1909.
1,016,893.
Patented Feb. 6, 1912.
4 SHEETS—SHEET 4.
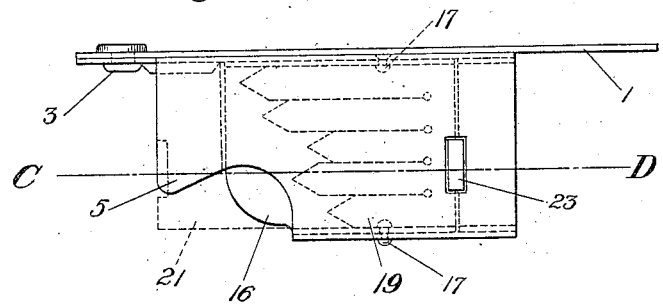
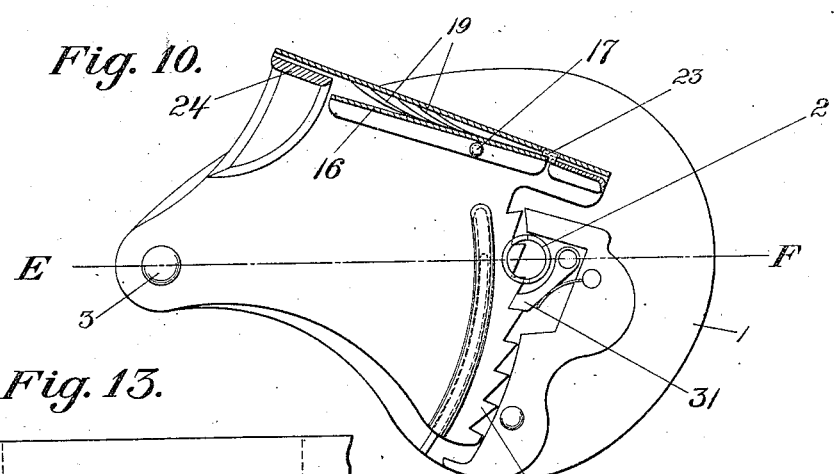
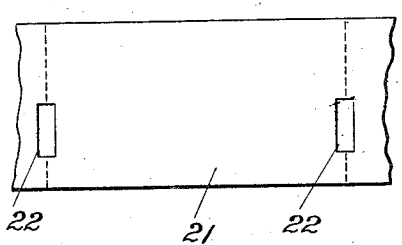
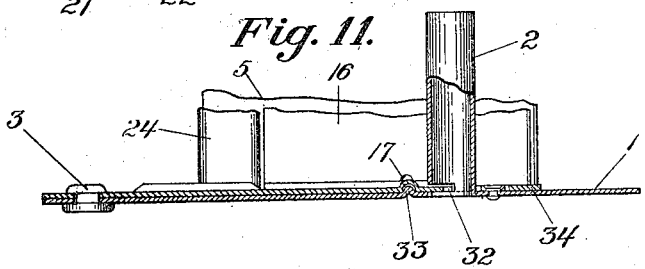
Witnesses:
John Darby
Rose Menk
Fred Oppenheimer
Wm G Spiegel
Inventor
By their Attorney John D. Morgan

UNITED STATES PATENT OFFICE.

FRED OPPENHEIMER AND WILLIAM G. SPIEGEL, OF NEW YORK, N. Y.; SAID SPIEGEL ASSIGNOR TO SAID OPPENHEIMER.

TICKET HOLDING AND SERVING DEVICE.

1,016,893.  Specification of Letters Patent.  Patented Feb. 6, 1912.

Application filed May 8, 1909. Serial No. 494,920.

*To all whom it may concern:*

Be it known that we, FRED OPPENHEIMER and WILLIAM G. SPIEGEL, citizens of the United States, residing in the city of New York and State of New York, have invented new and useful Improvements in Ticket Holding and Serving Devices, of which the following is a specification.

The invention relates to devices for holding and serving checks or other tickets, and in some of its features more especially to devices for holding and serving successively checks or other tickets in the form of a strip or web, and which may be of the same size and also may be consecutively numbered.

Objects of the invention are to provide a simple and substantial holder which will prevent removal of the ticket strip, after it has been once inserted in place in the device, while allowing the tickets to be removed one at a time from the end of the strip; to provide a device which will take rolls of tickets of widely varying size while acting in the manner just described; to provide a device which will continue to safeguard the ticket strip as it grows smaller and smaller as the tickets are fed off; to protect the operating parts of the device from interference by unauthorized persons; to provide for the rapid and easy feeding off of the tickets one at a time; to provide a simple, reliable and convenient device for serving checks and other tickets which is designed to prevent collusion and fraud in connection therewith. These and other objects of invention will in part be obvious and will in part be set forth hereinafter.

The invention consists in the novel articles, parts, combinations, arrangements and improvements herein shown and described.

The accompanying drawings, referred to herein and forming a part hereof, illustrate one embodiment of the invention, the same serving in connection with the description herein to explain the principles of the invention.

Figure 1:
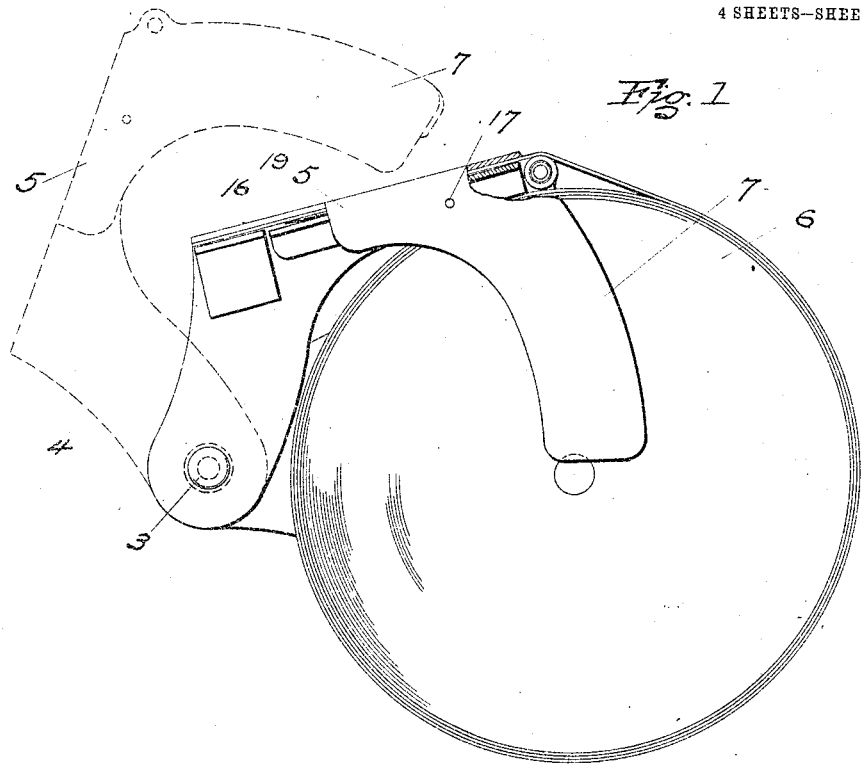
Figure 2:
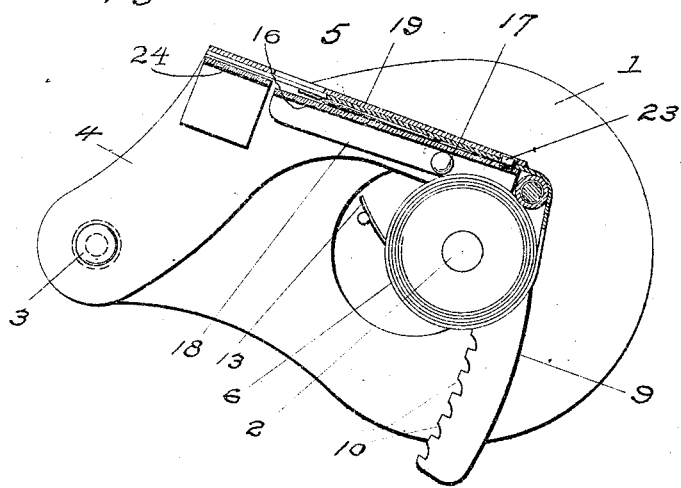

Of the drawings: Figure 1 illustrates a device constructed in accordance with the principles of the invention, showing a roll of tickets carried thereby; Fig. 2 is a section taken on the line A—B of Fig. 4 and showing a smaller, or partially used ticket strip carried by the device; Fig. 3 is a view corresponding to Fig. 1, but showing the mechanism without a ticket strip; Fig. 4 is a top plan view referred to Fig. 1; Fig. 5 is a detail of the ratchet mechanism; Fig. 6 is a central section referred to Fig. 5; Fig. 7 shows one form of ticket with parts of the device coöperating therewith. Fig. 8 is an elevation of a device constructed in accordance with the principles of the invention but of somewhat different form from that shown in Fig. 1; Fig. 9 is a section on line C—D of Fig. 12 showing a smaller or partly used ticket strip carried by the device; Fig. 10 is a view corresponding to Fig. 9 but with the ticket strip omitted to show certain parts more clearly; Fig. 11 is a fragmentary view on the line E—F of Fig. 10; Fig. 12 is a top plan corresponding to Fig. 8 with the roll omitted; and Fig. 13 shows a form of ticket strip.

Referring to the accompanying drawings, by way of example, there is shown a frame member 1 and associated therewith a support for a strip of tickets in the form of a roll, said support being shown herein as a spindle 2 extending from said frame member 1, so that the roll 6 supported on the spindle will have its side against said frame member. Suitable means for preventing irregular or unauthorized handling or withdrawal of the tickets once the roll is in position in the device are provided by the invention, in one aspect thereof, and the form of such means shown in the present embodiment comprises a movable member adapted to follow the peripheral face of the roll as the tickets are served off, and also a member in close contiguous relation to the side of the ticket roll opposite or away from the frame member 1, thereby holding the roll closely against the frame member while permitting free rotation of the roll. In the drawings there is shown pivoted to the frame member 1 at 3 a member 4, shown in Figs. 1, 2 and 3 as an arm to which is attached a flat plate 5 which may bear on the peripheral face of the roll 6 as shown in Fig. 1. In Figs. 8, 9 and 10 a different construction is shown which will be explained more fully hereinafter. As is further illustrated in the drawings, a plate or arm 7 is shown attached to the plate 5 and extending along the side of the roll 6 opposite the side against the frame member 1.

The structure just described, which for convenience may be styled a guard frame, may be swung about its pivotal mounting 3 to a position similar to that shown in dotted lines in Fig. 1, so that a roll of tickets may be readily slipped on the spindle 2, when the guard frame may be swung back to the position shown in full lines in Fig. 1.

In one of its features the invention provides means protected from access by the ticket roll when carried on the spindle 2, so that after the roll is placed on the spindle and the parts are moved to the full line position of Fig. 1 it will then be impossible to retract them until the roll of tickets is exhausted. In the illustrated form of such means, an arm 9 is shown in Figs. 1, 2 and 3 extending from the plate 5 in contact with, or closely adjacent to the frame member 1, said arm 9 being further shown of arcuate form and having a series of inclined teeth 10. Coöperating therewith is shown a pawl 11, pivoted at 12, upon the frame member 1, and acted on by a suitable spring 13. It will be understood that the guard frame cannot be retracted by applying force thereto after the pawl 11 has engaged the teeth 10, but that it will be necessary first to move and hold the pawl out of engagement with the teeth. As the pawl is located between the frame member 1 and the ticket roll and as the plate 7 prevents movement of the ticket roll along its spindle, it will be seen that the pawl is inaccessible until the ticket roll is used up by being fed off the end of the strip, ticket by ticket.

In Figs. 8, 9, 10 and 11, the member 4 is shown as a flat plate lying within and sliding upon the flat frame member 1. The outer edge of the plate 4 is shown having formed thereon a series of teeth 30. The toothed edge of the plate 4 may have suitable guiding or retaining means and is shown working in a guide slot or kerf 32 in the spindle 2 (see Figs. 10 and 11). Detent means coöperating therewith to prevent retractive movement thereof and of the attached plate 5 and associated parts are provided. In the illustrated form thereof, there is shown a spring pressed pawl 31 engaging with the teeth 30. The teeth are shown inclined and the pawl working against the short face so that if an effort be made to draw back the plate 5, the thrust is taken up longitudinally, and through the pivot to the pawl. The plate 4 with the teeth 30 carried and supported thereby, as well as the relative arrangement of the teeth and pawl, provides a structure which is at once simple, light, strong and reliable. Means are also provided to prevent tampering with the pawl by the insertion of any tool or instrument between the ticket roll and the frame member 1, and in Figs. 2, 3, 5 and 6 of the drawings the pawl 11 is shown mounted on a sunken or let in portion 15 of the frame member 1. A laterally projecting nose 24 on the pawl engages the rack teeth 10 and is also protected by the teeth from being moved while the roll is in the machine.

In Figs. 9, 10 and 11 there is shown for the purpose of guarding the detent means from molestation, a form of means comprising a ridge or boss 33 in the frame plate 1 and in the plate 4, one working within the other. This ridge or boss is shaped to permit the relative movement of the members 1 and 4 and it is shown herein of arcuate form and centering at the point 3. On the opposite side of the pawl 31 and teeth 30 is shown a projection or plate 34 disposed about the pawl. Said projection may extend around to substantially meet the boss 33 as shown in Fig. 10. It will be seen that the pawl is protected from access until the roll of tickets has been used.

Means are provided for feeding out and detaching one by one the tickets from the strip, and in the present form thereof a plate 16 is shown pivoted at 17 to the plate 7 and at 18 to the plate or arm 4. Said pivoted plate 16 is provided with suitable detent means for engaging the strip to permit forward feed thereof but preventing rearward movement thereof. The form of detent means shown herein is adapted especially to coöperate with a ticket strip 21, having perforations 22 therein, as shown in Fig. 7, although other forms of detent means might be used such as points impinging diagonally against the ticket strip. A projection 23 is shown attached to the plate 16 which engages each perforation successively as it is fed past.

The parts may be proportioned so that the ticket strip is arrested with the joint of two successive tickets, or a length of strip just sufficient for a ticket, protruding beyond the end of the plate 5, which may thus constitute, if desired, a straight or tearing edge for detaching the ticket. A spring 19 serves to normally press the pin 23 inwardly against the ticket strip. Said spring 19 is shown as having a plurality of fingers or prongs of different lengths, thereby making it impossible or extremely difficult to simultaneously lift all the points. Furthermore, any pressure against said spring to lift it away from the ticket strip would still cause it to press against the plate 16 and thus still maintain the pin 23 in the perforation in the ticket strip. As said spring serves also, by impinging diagonally against the ticket strip to prevent a backward or retractive feed thereof, it will be seen that it acts as a safeguard against removal of the strip end from the proper place for feeding out and detaching the successive tickets from the strip. Adjacent to the front end of the plate 5 is shown a plate 24 fixed to the arm 4 thereby making a slot or guide through which the ticket may be fed out, and which may, if desired, be used as a tearing edge.

The invention, in one of its features, provides for the easy and rapid engagement and detachment of the tickets successively from the end of the strip, and as shown herein the plate 5 is cut away at 20 so as to leave the ticket end exposed and also the end of the pivoted plate 16, so that no preliminary movement of any part or mechanism is required but merely to grasp the exposed corner of the ticket 21, and with it as a matter of course the end of the plate 16, which rocks against its spring 19, causing the projection 23 to pass out of engagement with the hole in the strip, or in case of some other form of detent, causing it to pass out of engagement with the strip which is then free to move for a ticket length when it is again stopped (see especially Fig. 4.) The dividing line between the end ticket and the next one is now at the outer edge of the plate 5 and said ticket may be quickly detached, either by pulling straight out or diagonally, by using the edge of the plate 5 as a tearing edge. The pressure of the hand in tearing off successive tickets will cause the plate 5 to bear on the peripheral face of the roll and thus to follow it as it decreases in size and as each tooth 10 on the arm 9 successively reaches the pawl 11 and is engaged thereby any retractive movement of the plate 5 is prevented. To prevent the undetected pulling out of the entire strip and the substitution of a different one, as might occur in some instances, as through collusion of cashier or waiter, the tickets may be serially numbered and the number of the last ticket on the interior of the roll made of record elsewhere or imprinted on a core of wood or other suitable material at the center of the roll.

The operation of the described mechanism will be clearly understood from the foregoing and any further statement of operation is unnecessary. It will be understood further that a device has been provided realizing the objects of the invention and the advantages herein set forth, together with other objects and advantages.

The invention, it will be understood is not limited to the structures herein shown, but covers also equivalents and changes within the scope of the accompanying claims.

What we claim as our invention and desire to secure by Letters Patent, is:

1. A ticket holding and serving device including in combination a frame member, a spindle for holding a roll of tickets with its side toward the frame member, a detent member alongside the spindle and against the frame member so as to be covered by the ticket roll, means for preventing access to the pawl between the ticket roll and frame member, a movable member adjacent to the periphery of the ticket roll, and a detent member extending from said movable member to engage said first mentioned member between the ticket roll and said frame member.

2. A ticket holding and serving device including in combination a frame member, means for supporting a roll of tickets with the side of the roll closely contiguous to the frame member, a movable member adapted to follow the peripheral face of the ticket roll as the tickets are served off, and means protected from access by said ticket roll for preventing the retraction of said movable member from the face of the roll, said means becoming accessible when the roll is exhausted.

3. A ticket holding and serving device including in combination a frame member, a support for rotatably holding a ticket roll with its side against said frame member, a member movable to and from the side of said ticket roll opposite said frame member, connections for holding said movable member against said face which are inaccessible for disconnection until the ticket roll is exhausted, and means for preventing access between the roll and frame to disconnect said connections.

4. A ticket holding and serving device including in combination a casing and supporting means for a ticket strip, and a member having a detent normally engaging the strip to prevent its being drawn out, said member being arranged so that it may be grasped by the hand together with the end of the strip to simultaneously disengage the detent and begin the removal of the strip from the casing.

5. A ticket holding and serving device including in combination a casing and supporting means for a ticket strip, a movable member having a detent normally engaging the ticket strip to prevent its being drawn out of the casing, and a member having a straight or tearing edge for detaching the tickets and a cut away portion to permit said ticket strip and said movable detent member to be grasped together within said straight edge.

6. A ticket holding and serving device including in combination means for storing a ticket web, means for directing the end of the web, a detent engaging said web, and connections for disengaging said detent to permit the web to feed located contiguously to said directing means, so as to be actuated by the hand in grasping the end ticket of the web to withdraw it.

7. A ticket holding and serving device including in combination means for storing a ticket web, means for engaging successive tickets as one ticket after another is withdrawn and detached, and connections for disengaging said engaging means from a ticket arranged to be actuated by the hand engaging the end ticket of the web to withdraw it.

8. A ticket holding and serving device including in combination means for storing a web of tickets, said web having perforations therein a ticket length apart, a closed guideway through which the tickets are fed out, a detent which engages within said guideway the successive perforations as ticket after ticket is withdrawn, and means located near the end of said guideway which may be grasped by the hand withdrawing the end ticket for causing said detent to pass out of the perforation.

9. A ticket holding and serving device including in combination a plate forming one side of a guideway for the ticket web, a pivoted plate forming the opposed side of the guideway, a detent carried by said pivoted plate to engage the web, and a spring within the guideway acting on said pivoted plate to press the detent into the web.

10. A ticket holding and serving device including in combination a plate forming one side of a guideway for the ticket web, a pivoted plate forming the opposed side of the guideway, a detent carried by said pivoted plate to engage the web, a spring acting on said pivoted plate to press the detent into the web, said first mentioned plate having a portion cut away to permit the pivoted plate and ticket web to be grasped together by the hand of the operator, so that the detent may be retracted by grasping the ticket to remove it.

11. A ticket holding and serving device including in combination a plate forming one side of a guide way for the ticket web, a pivoted plate forming the opposed side of the guideway, a detent carried by said pivoted plate to engage the web, and a spring within the guideway fastened to the pivoted plate and pressing against said first mentioned plate, or the interposed web.

12. A ticket holding and serving device including in combination a plate forming one side of a guideway for the ticket web, a pivoted plate forming the opposed side of the guideway, a detent carried by said pivoted plate to engage the web, and a spring fastened to the pivoted plate at the opposite side of the pivot bearing from the detent, and pressing against said first mentioned plate, or the interposed web.

13. A ticket holding and serving device including in combination means for supporting a ticket roll, means for confining the ticket roll, a plate closely contiguous to the side of the ticket roll having a recessed portion, a pawl within said recessed portion, a rack bar extending from said confining means between said plate and the contiguous side of the roll, and in operative relation with said pawl, the pawl having a laterally disposed tooth extending outwardly from the recess to engage the rack bar.

14. A ticket holding and serving device including in combination a flat member, means for rotatably supporting a roll of tickets with the side of the roll closely contiguous to said flat member, means for preventing withdrawal of the roll from its position contiguous to said flat member, detent means connected to said preventing means, said detent means being located between said member and the ticket roll, and a projection on said flat member and about the detent means to prevent access to the detent means between said flat member and the roll.

15. A ticket holding and serving device including in combination a flat member, means thereon for supporting a ticket roll, a flat member pivoted on said first flat member and carrying a set of teeth on its edge, a pawl between the ticket roll and its supporting flat member for engaging said teeth to prevent movement of said second flat member in one direction and to permit it in the other.

16. A ticket holding and serving device including in combination a flat plate, a ticket roll supported with its side against said plate, a second plate pivoted on said plate, detent means between said first mentioned plate and the ticket roll and acting on said second plate, a projection on one of said plates and a corresponding projection on the other, one projection working within the other, said projections being arranged around the detent means to protect said means from access.

17. A ticket holding and serving device including in combination a plate, a roll of tickets supported thereon, a follower for the periphery of said ticket roll, means for preventing removal of said roll from its support, detent means located between said plate and said roll, a plate moving on said first mentioned plate and connected to said follower and to said preventing means, a ridge in each of said plates, the ridge in one plate being within the ridge in the other, said ridges being arranged to prevent access to the detent means between the roll and the plate.

18. A ticket holding and serving device including in combination a flat plate, means for rotatably supporting a roll of tickets with the side thereof against said plate, means for maintaining the roll in said position, detent means, connections between said detent means and said maintaining means, comprising a flat plate moving on said first mentioned plate, and a projection on one of said plates working in a recess in the other of said plates and arranged about said detent means to prevent access thereto between the ticket roll and the plate.

In testimony whereof, we have signed our names to this specification, in the presence of two subscribing witnesses.

FRED OPPENHEIMER.
WILLIAM G. SPIEGEL.

Witnesses:
 JOHN D. MORGAN,
 ROSE MENK.